United States Patent
Kang

(12) 
(10) Patent No.: US 6,198,780 B1
(45) Date of Patent: Mar. 6, 2001

(54) METHOD AND APPARATUS FOR SYMBOL TIMING RECOVERY OF A VESTIGIAL SIDEBAND TELEVISION SIGNAL

(75) Inventor: Hanbit Kang, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/132,665

(22) Filed: Aug. 12, 1998

(30) Foreign Application Priority Data

Sep. 12, 1997 (KR) .................................................. 97-46914
Sep. 12, 1997 (KR) .................................................. 97-46915

(51) Int. Cl.[7] .................................................. H04N 5/455
(52) U.S. Cl. .......................... 375/321; 375/355; 348/726
(58) Field of Search .................................... 375/321, 355; 348/729, 735, 500, 726, 536, 538

(56) References Cited

U.S. PATENT DOCUMENTS 5,588,025 * 12/1996 Strolle et al. ........................ 375/316
5,673,293   9/1997 Scarpa et al. .
5,805,242 * 9/1998 Strolle et al. ........................ 348/726
5,943,369 * 8/1999 Knutson et al. ...................... 375/326

FOREIGN PATENT DOCUMENTS 0765057   3/1997 (EP) .
9526074   9/1995 (WO) .

* cited by examiner

Primary Examiner—Amanda T. Le
(74) Attorney, Agent, or Firm—Pennie & Edmonds LLP

(57) ABSTRACT

An apparatus efficiently performs symbol timing recovery of sampled data included in a vestigial sideband (VSB) signal. Each of the sampled data is first filtered to output a positive and a negative band edge filtered components thereof. Thereafter, the negative band edge filtered component is processed to obtain a conjugate complex component; and the positive band edge filtered component is multiplied by the conjugate complex component to provide a multiplied component as symbol timing information. Finally, each of the sampled data is corrected based on the symbol timing information to generate interpolated data thereon as the timing recovered data.

6 Claims, 4 Drawing Sheets

METHOD AND APPARATUS FOR SYMBOL TIMING RECOVERY OF A VESTIGIAL SIDEBAND TELEVISION SIGNAL

FIELD OF THE INVENTION

The present invention relates to a vestigial sideband (VSB) demodulating system; and, more particularly, to a method and apparatus for recovering symbol timing of a VSB television signal transmitted from a transmitter.

BACKGROUND OF THE INVENTION

As is well known, an advanced television (ATV) system is provided with a vestigial sideband (VSB) demodulator for demodulating a VSB television signal transmitted from a transmitter which employs a VSB modulation technique.

Basic components of a VSB demodulator include a tuner module having a tuner, an analog/digital (A/D) converter and an automatic gain controller (AGC), a VSB carrier recovery circuit and a VSB timing recovery circuit. Specifically, a VSB television signal having a plurality of symbol data is received by the tuner via an antenna to selectively receive a VSB signal which corresponds to a channel selected by a user. The VSB signal received by the tuner is then digitized by the A/D converter according to a certain sampling rate to provide a digitized VSB signal to the AGC.

At the AGC, the gain of the digitized VSB signal is adjusted to a predetermined level and the digitized VSB signal so adjusted is then provided to the VSB carrier recovery circuit. At the VSB carrier recovery circuit, a carrier recovery operation on the adjusted digitized VSB signal is carried out. Specifically, a pilot tone is first extracted from the adjusted digitized VSB signal by a band pass filter and then applied to a phase locked loop (PLL) circuit to obtain a recovered carrier signal. The recovered carrier signal is then delivered to a next processor, e.g., an equalizer, for further processing thereof.

In the meantime, the VSB timing recovery circuit receives the VSB television signal and performs, on a symbol data basis, a timing recovery operation thereon so as to control the sampling rate of the A/D converter. By controlling the sampling rate, the symbol rate of the VSB television signal can be synchronized with the rate of a clock in the transmitter.

One of the conventional VSB demodulators incorporating therein a VSB timing recovery circuit is disclosed in U.S. Pat. No. 5,673,293. The VSB timing recovery circuit disclosed therein includes a voltage control oscillator (VCXO), a digital to analog (D/A) converter, and a VSB timing recovery module which has a synchronization (SYNC) detector/locator, a discriminator circuit, a switch and a PLL circuit. Specifically, the SYNC detector/locator receives a real passband VSB signal and detects a timing SYNC signal therefrom. When the timing SYNC signal is detected from the real passband VSB signal received, a switch control signal is issued from the SYNC detector/locator to the switch to close it. In response to the switch control signal, an output from the discriminator is coupled to the PLL circuit through the switch to extract a VSB symbol timing signal therefrom. Thereafter, the VSB symbol timing signal is provided to the A/D converter through the D/A converter and the VCXO for use in digitizing the VSB television signal.

In the conventional VSB timing recovery device, however, the timing recovery operation on each of the symbol data included in the VSB television signal is carried out only when the timing SYNC signal is detected, thereby resulting in a prolonged process time for the whole timing recovery of the VSB television signal.

SUMMARY OF THE INVENTION

It is, therefore, a primary object of the present invention to provide a method and apparatus, capable of providing an efficient symbol timing recovery operation on a VSB television signal transmitted.

In accordance with one aspect of the invention, there is provided a method for symbol timing recovery of each of sampled data included in a vestigial sideband (VSB) signal transmitted to obtain interpolated data on said each of the sampled data as timing recovered data, which comprises:

(a) filtering said each of the sampled data to output a positive and a negative band edge filtered components thereof;

(b) processing the negative band edge filtered component to obtain a conjugate complex component thereon and multiplying the positive band edge filtered component by the conjugate complex component to extract symbol timing information on said each of the symbol data from the multiplied component;

(c) deriving a phase error value of said each of the sampled data by using the symbol timing information;

(d) calculating a mean phase error value of a set of phase error values out of the phase error values, the set of phase error values corresponding to said each of the sampled data and one or more of its previous sampled data;

(e) adding a predetermined value to the mean phase error value to derive a phase corrected value and comparing the symbol rate of the phase corrected value with a predetermined symbol rate to produce a signal indicating the compared result; and (f) correcting said each of the sampled data by replacing it with one of a set of predetermined interpolated data on the basis of the phase corrected value and the comparison result signal to obtain the interpolated data thereon.

In accordance with another aspect of the invention, there is provided a symbol timing recovery apparatus for timing recovery of each of sampled data included in a vestigial sideband (VSB) signal to obtain interpolated data on said each of the sampled data as timing recovered data, the apparatus comprising:

means for filtering said each of the sampled data to output a positive and a negative band edge filtered components thereof;

means for processing the negative band edge filtered component to obtain a conjugate complex component thereon and multiplying the positive band edge filtered component by the conjugate complex component to extract symbol timing information on said each of the sampled data from the multiplied component; and means for correcting said each of the sampled data based on the symbol timing information to obtain the interpolated data thereon.

BRIEF DESCRIPTION OF THE DRAWINGS

The above and other objects and features of the present invention will become apparent from the following description of preferred embodiments given in conjunction with the following accompanying drawings, in which.

DETAILED DESCRIPTION OF THE PREFERRED EMBODIMENTS

Figure 1:
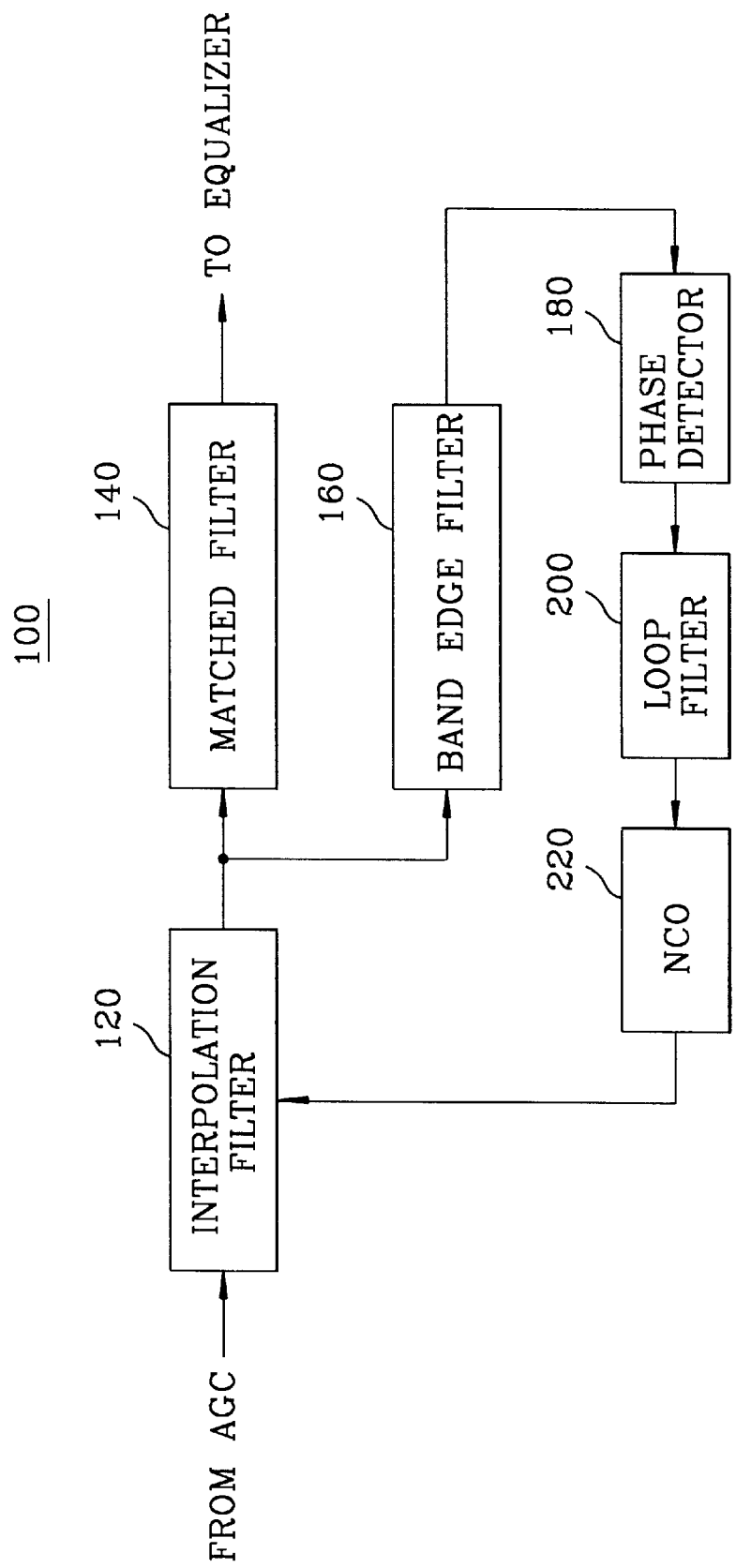
FIG. 1 shows a block diagram of a symbol timing recovery apparatus in accordance with the present invention.

Referring to FIG. 1, there is provided a block diagram of a symbol timing recovery apparatus 100 for use in a VSB demodulator (not shown) in accordance with the present invention. The inventive apparatus 100 comprises an interpolation filter 120, a matched filter 140, a band edge filter 160, a phase detector 180, a loop filter 200 and a numerically controlled oscillator (NCO) 220.

Each of sampled data of a baseband sampled VSB signal is first fed from an AGC (not shown) to the interpolation filter 120 which replaces said each of the sampled data with interpolated data based on a phase corrected value and a control signal provided from the NCO 220. Each of the sampled data is the one which is not synchronized with a clock in the transmitter and includes a real component I and an imaginary component Q in the baseband.

To obtain each of the symbol data in the baseband, first, a VSB television signal transmitted is sampled at a predetermined sampling rate to generate two sampled data per one symbol in an intermediate frequency band at a proceeding processor (not shown). After completing the sampling process, each of the two sampled data is complex demodulated to obtain said each of the sampled data having the real component I and imaginary component Q in the baseband. Details of the phase corrected value and the control signal will be given with reference to FIGS. 1 and 2 later.

The band edge filter 160, which is one of the high pass filters, filters each of the sampled data applied thereto to extract only a positive and a negative band edge filtered components, which are its high band components, therefrom. Each of the positive and the negative band edge filtered components includes a real component I and an imaginary component Q. The positive and the negative band edge filtered components are then delivered to the phase detector 180.

At the phase detector 180, a phase error value of each of the sampled data is derived based on the positive and the negative band edge filtered components. Details of the phase detector 180 will be provided with reference to FIG. 2 hereinafter.

Figure 2:
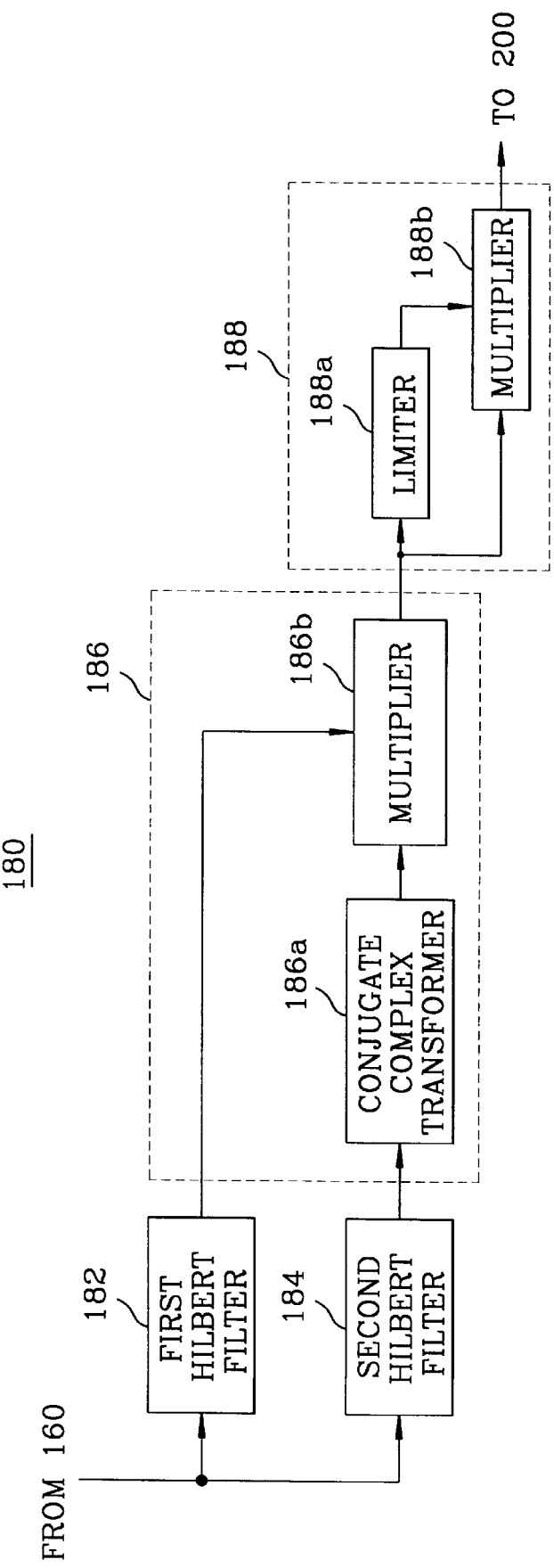
FIG. 2 provides a detailed block diagram of the phase detector shown in FIG. 1.

Turning now to. FIG. 2, there is depicted a detailed block diagram of the phase detector 180 in accordance with the invention, wherein the phase detector 180 includes a first and a second hilbert filters 182 and 184, a complex multiplier 186 and a phase error detector 188. The inputs, i.e., the positive and the negative band edge filtered components, to the phase detector 180 are not symbol timing information. Accordingly, the phase detector 180 first derives symbol timing information on said each of the sampled data and then calculates a phase error value thereof based on the symbol timing information. In a preferred embodiment of the invention, as will be described below, the symbol timing information is obtained by taking account of characteristics that a bandwidth of the baseband VSB signal is identical to a symbol rate of VSB television signal at the transmitter.

Specifically, each of the first and the second hilbert filters 182 and 184 may be implemented by properly combining a plurality of delay registers, several multipliers, several substractors and adders (not shown) well known in the art. The first hilbert filter 182 receives the positive and the negative band edge filtered components from the band edge filter 160 shown in FIG. 1 and detects only the real component I and the imaginary component Q of the positive band edge filtered component. In other words, both of the components, i.e., the real component I and the imaginary component Q, can be detected by multiplying the positive and the negative band edge filtered components by a transfer function which may be decided in advance based on output values of the circuit devices contained in the first hilbert filter 182, respectively. The real component I and the imaginary component Q of the positive band edge filtered component are then supplied to the complex multiplier 186.

Meanwhile, the second hilbert filter 184 receives the positive and the negative band edge filtered components and detects only the real component I and the imaginary component Q of the negative band edge filtered component. Similarly, the both components can be detected by multiplying the positive and the negative band edge filtered components by another transfer function which may be decided in advance based on output values of the circuit devices contained in the second hilbert filter 184.

Thereafter, the real component I and the imaginary component Q of the negative band edge filtered component are provided to the complex multiplier 186. At the complex multiplier 186 containing a conjugate complex transformer 186a and a multiplier 186b, symbol timing information on each of the sampled data is extracted from the real I component and the imaginary Q component of the positive band edge filtered component and those of the negative band edge filtered component.

To be more specific, at the conjugate complex multiplier 186a, a conjugate complex transform operation is carried out first with respect to the real component I and the imaginary component Q of the negative band edge filtered component. After completing the conjugate complex transform, at the multiplier 186b, the conjugate complex components transformed are multiplied by the real component I and the imaginary component Q of the positive band edge filtered component provided from the first hilbert filter 182, respectively. The multiplied data having a new real component I and imaginary component Q is then delivered to the phase error detector 188, as the symbol timing information on said each of the sampled data.

As can be seen from the above, the symbol timing information is obtained from the devices, i.e., the two hilbert filters 182 and 184 and the complex multiplier 186, which are implemented by taking account of the characteristics that the bandwidth of the baseband VSB television signal is identical to the symbol rate of VSB television signal at the transmitter.

At the phase error detector 188, which contains a limiter 188a and a multiplier 188b, a phase error value of each of the sampled data is calculated on the basis of the symbol timing information. At the limiter 188a, only the real component I in the symbol timing information is first limited to output a limited real component I to the multiplier 188b. For example, if the real component I has a positive component, +1 is provided as the limited real component I; and, if the real component I has a negative component, −1 is provided as the limited real component I.

Thereafter, the multiplier 188b multiplies the limited real component I by the imaginary component Q in the symbol timing information to output multiplied data as the phase error value of said each of the sampled data. The phase error value may have zero value at an optimal sampling point of each of the sampled data; and has characteristics that in case the phase error value is very large, it may be represented as a curve having the larger error value within a predetermined period. The phase error value so calculated is then provided to the loop filter 200 shown in FIG. 1.

Referring back to FIG. 1, the loop filter 200 calculates a mean phase error value of a set of phase error values out of the phase error values, which is stored therein, the set of phase error values corresponding to said each sampled data and one or more its previous symbol data. In other words, the mean phase error value may be obtained by properly giving a set of predetermined weighted values to the set of phase error values through the use of a conventional loop filtering technique. For instance, for more rapid timing recovery, it may be designed that the relatively large values among the set of predetermined weighted values are assigned to the phase error values recently obtained.

Figure 3:
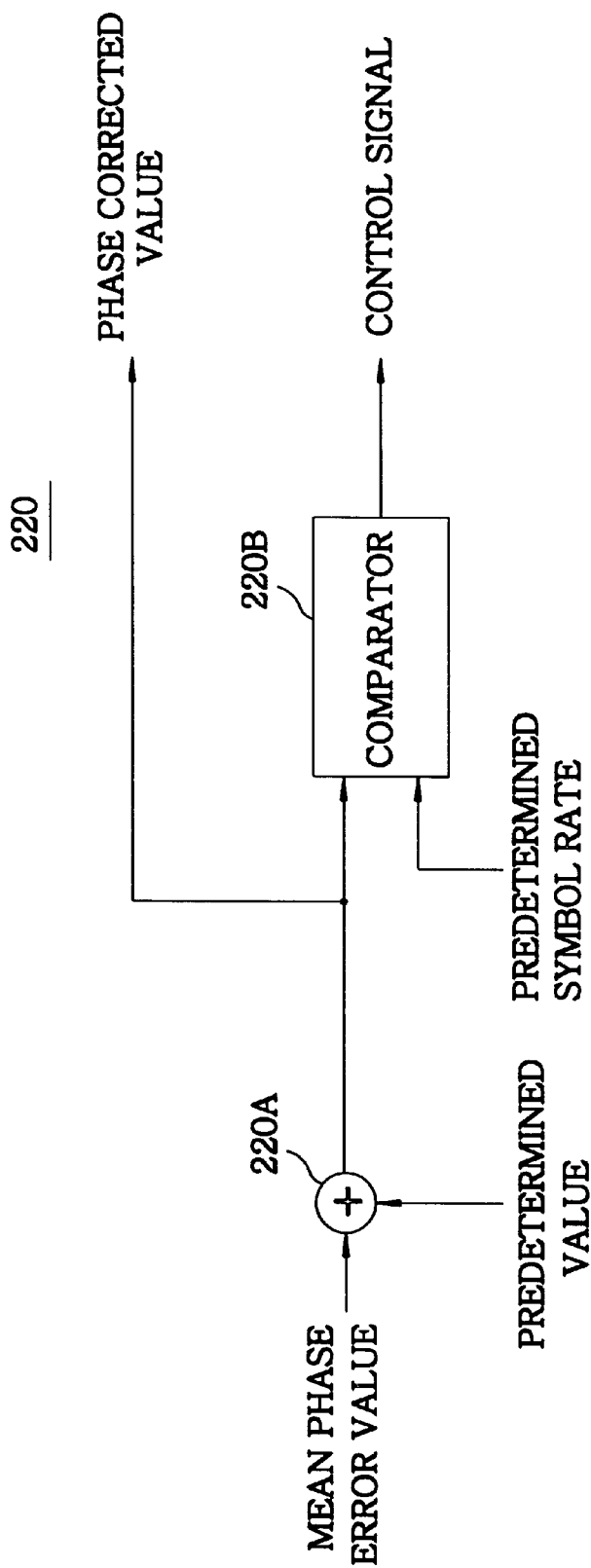
FIG. 3 describes a detailed block diagram of a numerically controlled oscillator shown in FIG. 1.

Thereafter, the mean phase error value is supplied from the loop filter 200 to the NCO 220. At the NCO 220, the phase corrected value and the control signal to be provided to the interpolation filter 120 are derived based on the mean phase error value. The control signal is a signal indicating whether the symbol rate of each of the sampled data is identical to a predetermined symbol rate or not. Referring to FIG. 3, there is illustrated a detailed block diagram of the NCO 220. To obtain the control signal, the mean phase error value is first added to a predetermined value at an adder 220A and then, it is checked whether or not the symbol rate of each of the sampled data is identical to the predetermined symbol rate based on the added value at a comparator 220B. Finally, the control signal is decided according to the checked result.

The phase corrected value is also obtained by adding the predetermined value to the mean phase error value to make the symbol rate of each of the sampled data transmitted same to that of the clock at the transmitter. The phase corrected value and the control signal are then provided to the interpolation filter 120.

Figure 4:
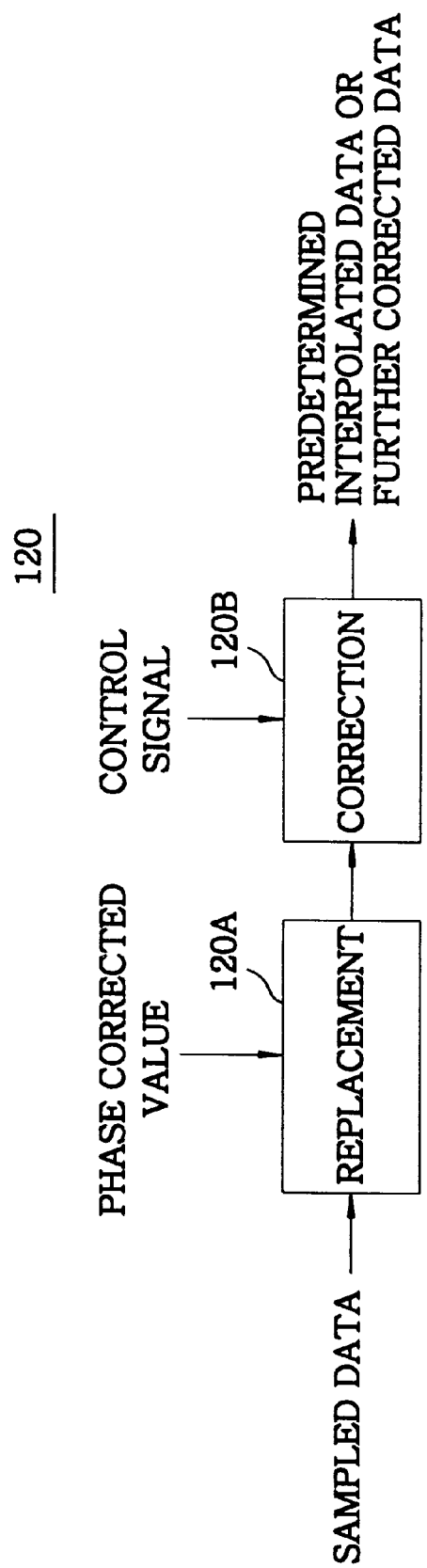
FIG. 4 illustrates a detailed block of an interpolation filter shown in FIG. 1.

At the interpolation filter 120 using a conventional interpolation technique in the VSB symbol timing recovery, each of the sampled data of the baseband VSB signal is replaced with one of a set of predetermined interpolated data by taking account of both the phase corrected value and the control signal. To be more specific, with reference to FIG. 4 illustrating a detailed block diagram of the interpolation filter 120 in response to the phase corrected value, each of the sampled data is first replaced with one of the set of predetermined interpolated data at a replacement block 120A. Next, in response to the control signal, the predetermined interpolated data replaced is further corrected at a correction block 120B.

For instance, in response the control signal indicating that the symbol rate of each of the sampled data is not identical to the predetermined symbol rate, the predetermined interpolated value is further corrected by removing a part thereof which corresponds to the difference of the both symbol rates. Additionally, a part of a reference clock corresponding to the difference of the symbol rates may be removed for timing recovery of following sampled data. On the other hand, in response the control signal indicating that the symbol rate of each of the sampled data is identical to the predetermined symbol rate, no further correction operation on the predetermined interpolated data is carried out.

Thereafter, the output from the interpolation filter 120, i.e., either the predetermined interpolated data or further corrected data is provided to the matched filter 140 to further filter it by employing a conventional matched filtering method. In other words, the matched filter 140 shapes pulses of the output from the interpolation filter 120 to maximize a signal to noise ratio (SNR) thereof. The output of the matched filter 140 is then fed to a following processor, e.g., an equalizer (not shown).

While the present invention has been shown and described with respect to the particular embodiment, it will be apparent to those skilled in the art that many changes and modifications may be made without departing from the spirit and scope of the invention as defined in the appended claims.

What is claimed is:

1. A symbol timing recovery apparatus for timing recovery of sampled data included in a vestigial sideband (VSB) signal to obtain interpolated data on each of the sampled data, the apparatus comprising:

means for filtering each of the sampled data to a output positive and a negative band edge filtered component thereof;

means for processing the negative band edge filtered component to obtain a conjugate complex component thereon and multiplying the positive band edge filtered component by the conjugate complex component to extract symbol timing information on said each of the sampled data from the multiplied component, wherein the symbol timing information has a real and an imaginary component; and means for correcting said each of the sampled data based on the symbol timing information to obtain the interpolated data thereon, wherein the processing means includes:
means for limiting the real component in the multiplied component to provide a limited real component; and
means for multiplying the limited real component by the imaginary component in the multiplied component to obtain the symbol timing information, and the correcting means includes:
means for calculating a phase error value of said each of the sampled data based on the symbol timing information;
means for deriving a mean phase error value of a set of phase error values out of the phase error values calculated, the set of phase error values corresponding to a combination of said each sampled data and one or more of previous sampled data thereof;
means for adding a predetermined value to the mean phase error value to derive a phase corrected value and comparing the symbol rate of the phase corrected value with a predetermined symbol rate to produce a signal indicating the compared result; and
means for correcting said each of the sampled data by replacing it with one of a set of predetermined interpolated data on the basis of the phase corrected value and the comparison result signal.

2. The apparatus of claim 1, wherein the correcting means further includes means for pulse shaping the pulses of the predetermined interpolated data that has replaced said each of the sampled data.

3. The apparatus of claim 2, wherein the pulse shaping means is a matched filter.

4. The apparatus of claim 1, wherein the adding and comparing means is a numerically controlled oscillator.

5. A method for symbol timing recovery of sampled data included in a vestigial sideband (VSB) signal transmitted to obtain interpolated data on each of the sampled data as timing recovered data, which comprises:

(a) filtering said each of the sampled data to output a positive and a negative band edge filtered components thereof;

(b) processing the negative band edge filtered component to obtain a conjugate complex component thereon and multiplying the positive band edge filtered component by the conjugate complex component to extract symbol timing information on said each of the symbol data from the multiplied component, wherein the symbol timing information has a real and an imaginary components;

(c) deriving a phase error value of said each sampled data by using the symbol timing information;

(d) calculating a mean phase error value of a set of phase error values out of the phase error values, the set of phase error values corresponding to a combination of said each of the sampled data and one or more of previous, sampled data thereof;

(e) adding a predetermined value to the mean phase error value to derive a phase corrected value and comparing the symbol rate of the phase corrected value with a predetermined symbol rate to produce a signal indicating the compared result; and (f) correcting said each of the sampled data by replacing it with one of a set of predetermined interpolated data on the basis of the phase corrected value and the comparison result signal to obtain the interpolated data thereon.

6. The method of claim 5, wherein the step (f) includes the step (f1) of pulse shaping the pulses of the predetermined interpolated data that has replaced said each of the sampled data.

* * * * *